US012680805B2

(12) United States Patent　　　　(10) Patent No.:　US 12,680,805 B2
Fujii et al.　　　　　　　　　　　　(45) Date of Patent:　　　Jul. 14, 2026

(54) ROTATION DETECTION DEVICE, ROTATION DETECTION METHOD, AND ROTATION DETECTION PROGRAM

(71) Applicant: MINEBEA MITSUMI Inc., Nagano (JP)

(72) Inventors: Jumpei Fujii, Nagano (JP); Juichi Uno, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 149 days.

(21) Appl. No.: 18/562,523

(22) PCT Filed: May 23, 2022

(86) PCT No.: PCT/JP2022/021149
§ 371 (c)(1),
(2) Date: Nov. 20, 2023

(87) PCT Pub. No.: WO2022/250022
PCT Pub. Date: Dec. 1, 2022

(65) Prior Publication Data
US 2024/0247927 A1　　Jul. 25, 2024

(30) Foreign Application Priority Data
May 27, 2021　(JP) ................................. 2021-089154

(51) Int. Cl.
*G01B 7/30*　　　　(2006.01)
*G01D 5/16*　　　　(2006.01)

(52) U.S. Cl.
CPC .................. *G01B 7/30* (2013.01); *G01D 5/16* (2013.01)

(58) Field of Classification Search
CPC ... G01B 7/30; G01D 5/12; G01D 5/14; G01D 5/142; G01D 5/145; G01D 5/16
See application file for complete search history.

(56) References Cited

U.S. PATENT DOCUMENTS 4,347,668 A * 9/1982 Johnston ................ G01B 5/255
33/193
5,027,648 A 7/1991 Filleau
(Continued)

FOREIGN PATENT DOCUMENTS

JP　　　S64-035211　　　2/1989
JP　　　H05-158541　　　6/1993
(Continued)

OTHER PUBLICATIONS

Office Action mailed on Mar. 11, 2025 with respect to the corresponding Japanese patent application No. 2021-089154.
(Continued)

*Primary Examiner* — Huy Q Phan
*Assistant Examiner* — David B Frederiksen
(74) *Attorney, Agent, or Firm* — IPUSA, PLLC

(57) ABSTRACT

A rotation detection device includes: a comparator configured to generate a digital signal that indicates a magnitude relationship between a voltage, which is output from a potentiometer in accordance with an amount of rotation of a rotating body, and a threshold voltage; and a controller configured to detect a number of complete turns of the rotating body based on transition edges of the digital signal. By this means, the number of complete turns of the rotating body can be detected through a simple process, so that the size of the rotation detection program can be reduced.

1 Claim, 4 Drawing Sheets

(56) References Cited

U.S. PATENT DOCUMENTS

| | | | | |
|---|---|---|---|---|
| 6,121,735 | A * | 9/2000 | Igeta | G01B 7/003 |
| | | | | 318/35 |
| 6,781,538 | B1 * | 8/2004 | Chamberlin, Jr. | G01D 5/165 |
| | | | | 330/296 |
| 2006/0017412 | A1 * | 1/2006 | Sasaya | H02P 7/04 |
| | | | | 318/368 |
| 2006/0288800 | A1 | 12/2006 | Mukai et al. | |
| 2010/0033064 | A1 * | 2/2010 | Tanaka | H02P 7/0094 |
| | | | | 310/67 R |
| 2013/0106435 | A1 * | 5/2013 | Mori | H03J 7/08 |
| | | | | 324/612 |
| 2013/0320970 | A1 * | 12/2013 | Foletto | G01D 5/2448 |
| | | | | 324/251 |
| 2018/0156640 | A1 | 6/2018 | Kobayashi et al. | |
| 2019/0293455 | A1 * | 9/2019 | Tonge | G01D 5/16 |
| 2020/0348150 | A1 * | 11/2020 | Cesaretti | G01D 5/16 |
| 2022/0049976 | A1 * | 2/2022 | Cosgrave | G01D 5/24457 |

FOREIGN PATENT DOCUMENTS

| | | | | |
|---|---|---|---|---|
| JP | H08-009670 | 1/1996 | | |
| JP | H10-062203 | 3/1998 | | |
| JP | 2000-205258 | 7/2000 | | |
| JP | 2007-010329 | 1/2007 | | |
| JP | 4900473 B2 * | 3/2012 | | G01D 5/2451 |
| JP | 2016-085195 | 5/2016 | | |
| JP | 2018-091747 | 6/2018 | | |
| WO | 2008/105217 | 9/2008 | | |

OTHER PUBLICATIONS

International Search Report for PCT/JP2022/021149 mailed on Jun. 28, 2022.

* cited by examiner

FIG.1

ROTATION DETECTION DEVICE, ROTATION DETECTION METHOD, AND ROTATION DETECTION PROGRAM

TECHNICAL FIELD

The present invention relates to a rotation detection device, a rotation detection method, and a rotation detection program.

BACKGROUND ART

To detect the position of a continuously rotating shaft by using a potentiometer, a method of eliminating undetectable positions by providing two potentiometers is known (see Patent Document 1). Also, a method of controlling the position of a rotating body is known, whereby a magnetic bearing control device controls the position of the rotating body by resetting the count value every time a sensor detects one rotation of the rotating body, and by detecting the number of complete turns of the rotating body based on the count value immediately before the reset (see Patent Document 2).

CITATION LIST

Patent Document

Patent Document 1: Unexamined Japanese Patent Application Publication No. H05-158541
Patent Document 2: Unexamined Japanese Patent Application Publication No. 2000-205258

SUMMARY OF THE INVENTION

Problem to be Solved by the Invention

For example, to detect the number of complete turns of a rotating body, a rotation detection device keeps, sequentially, the digital values obtained by converting the output voltages of a potentiometer through an analog-to-digital converter or the like, and determines whether the rotating body has completed one rotation based on the trend of change of the digital values kept therein. Digital values that correspond to output voltages are also used to detect the amount of rotation (rotational position) of the rotating body. Therefore, the higher the resolution of the analog-to-digital converter, the more accurately the rotation detection device can detect the amount of rotation of the rotating body.

However, when the resolution of an analog-to-digital converter increases, the amount of digital value data to be kept also increases. Furthermore, when the amount of digital value data increases, changes in the digital values become very small, and so the patterns of change become more complex. Consequently, the process of determining the trend of change in digital values becomes complex, and the size of the rotation detection program for detecting the number of complete turns of the rotating body increases. The technique disclosed herein has been made in view of the foregoing, and aims to provide a simple process for detecting the number of complete turns of a rotating body, and reduce the size of the rotation detection program.

Means for Solving the Problem

According to one embodiment of the present disclosure, a rotation detection device includes: a comparator configured to generate a digital signal that indicates a magnitude relationship between a voltage, which is output from a potentiometer in accordance with an amount of rotation of a rotating body, and a threshold voltage; and a controller configured to detect a number of complete turns of the rotating body based on transition edges of the digital signal.

Advantageous Effects of the Invention

It is therefore possible to provide a simple process for detecting the number of complete turns of a rotating body, and reduce the size of the rotation detection program.

BRIEF DESCRIPTION OF THE DRAWINGS

FIG. 1 is a block diagram that illustrates an example of a system including a rotation detection device according to a first embodiment.

EMBODIMENTS FOR CARRYING OUT THE INVENTION

Figure 2:
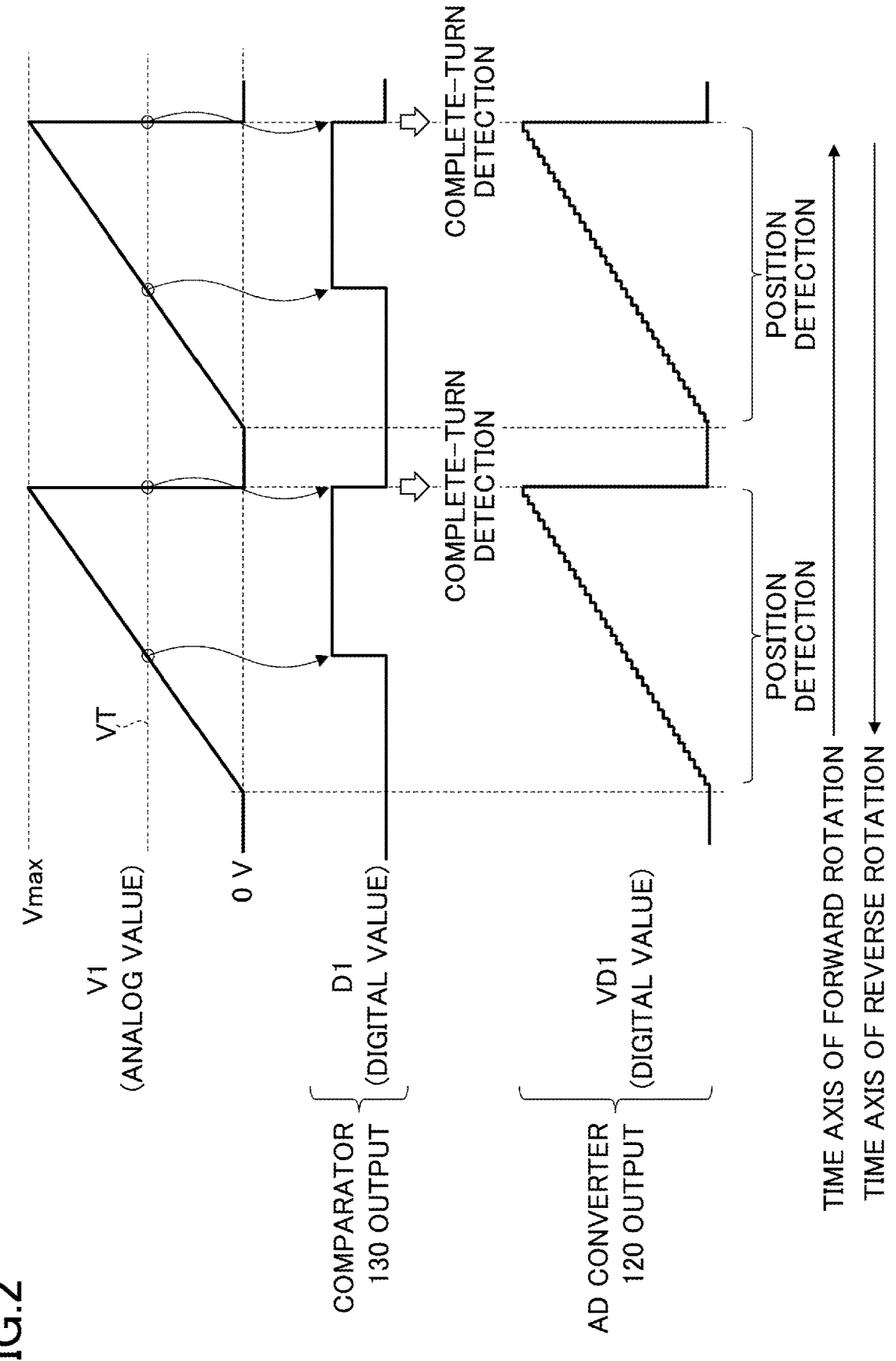
FIG. 2 is a timing diagram that illustrates an example of the operation of the rotation detection device of FIG. 1.

Hereinafter, an embodiment for carrying out the invention will be described with reference to the accompanying drawings. In the following description, signal wires in which information such as signals is transmitted will be assigned the same reference codes as signal names, and voltage wires or power supply wires will be assigned the same reference codes as voltage names or power supply names.

Figure 1:
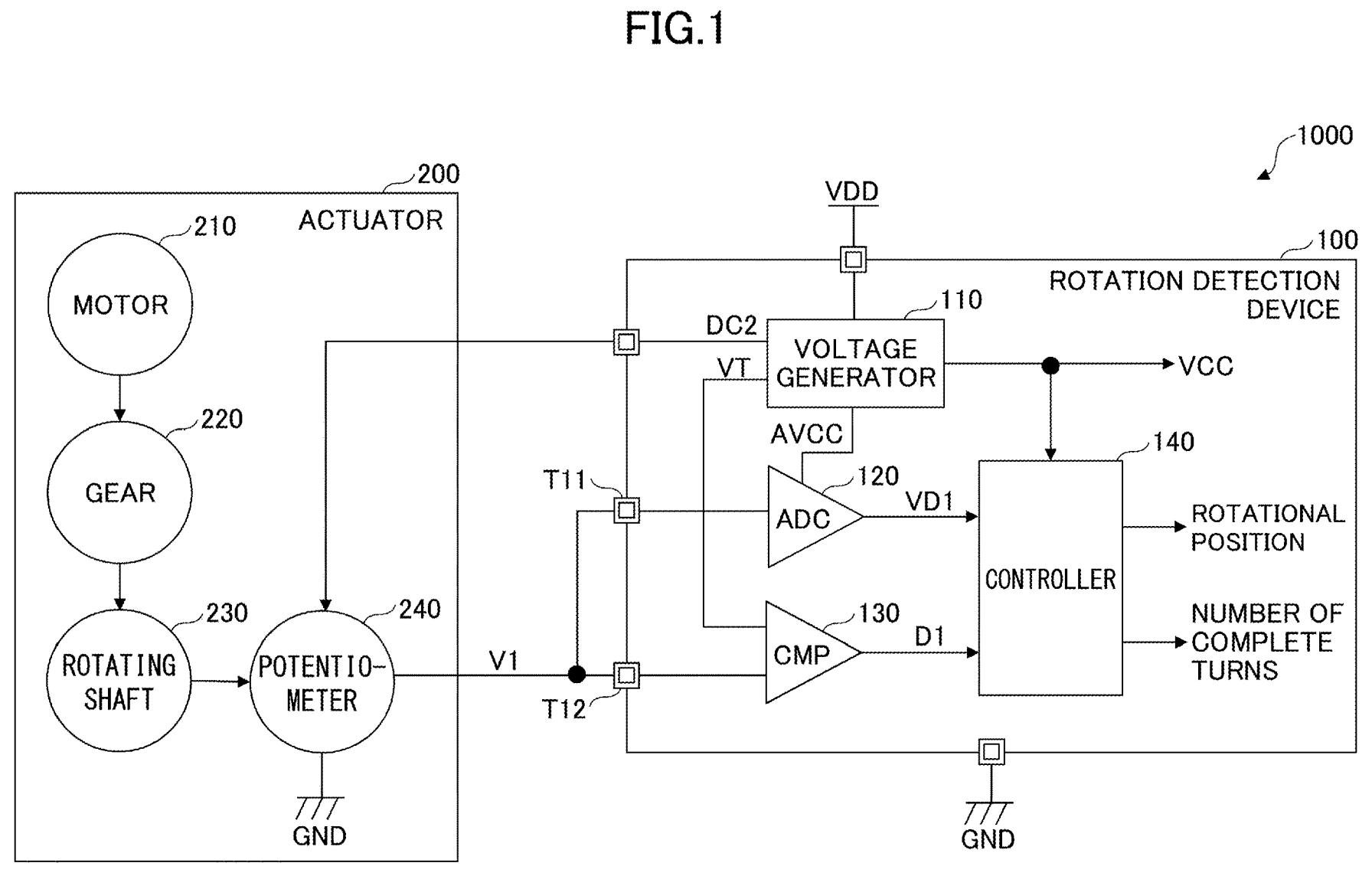

FIG. 1 is a block diagram that illustrates an example of a system including a rotation detection device according to a first embodiment. The system 1000 shown in FIG. 1 includes a rotation detection device 100 and an actuator 200. The system 1000 is, for example, an air conditioning system for automobiles, such as a heating, ventilation, and air conditioning (HVAC) system, but this is by no means a limitation.

The rotation detection device 100 includes a voltage generator 110, an analog-to-digital converter (ADC) 120, a comparator (CMP) 130, and a controller 140. The actuator 200 includes a motor 210, a gear (reduction gear) 220, a rotating shaft (rotor) 230, and a potentiometer 240. The rotating shaft 230 is an example of a rotating body. In the following description, the analog-to-digital converter 120 will also be referred to as "AD converter 120."

The motor 210 is, for example, a stepping motor. The motor 210 rotates forward or in the reverse direction, in accordance with pulse signals from a driver (not shown). The gear 220 is connected between the motor 210 and the rotating shaft 230, and transmits decelerated rotation of the motor 210 to the rotating shaft 230. The rotating shaft 230 is connected to, for example, a vane that adjusts airflow, a valve that adjusts the rate of airflow, and so forth.

The potentiometer 240 is positioned near the rotating shaft 230. The potentiometer 240 functions as a variable resistor whose resistance value changes depending on the rotational position (that is, the amount of rotation) of the rotating shaft 230, divides a DC voltage DC2, and outputs a voltage V1.

For example, based on an external power supply voltage VDD received from outside, the voltage generator 110 generates a DC voltage DC2 having a lower voltage value than the external power supply voltage VDD, a threshold voltage VT, a power supply voltage VCC, and a power supply voltage AVCC for analog circuits. The threshold voltage VT is set lower than the maximum voltage (for example, DC2) that is output from the potentiometer 240. Note that the threshold voltage VT may be supplied from outside the rotation detection device 100. In this case, the voltage generator 110 does not have the function to generate the threshold voltage VT. The power supply voltage VCC is used to supply power to digital circuits such as the controller 140 and comparator 130 provided in the rotation detection device 100. The power supply voltage AVCC is used to supply power to the AD converter 120 and the like.

The AD converter 120 converts a voltage V1, which is received via an external terminal T11, into a digital value, and outputs a digital voltage value VD1. The comparator 130 compares the voltage V1, which is received via an external terminal T12, and the threshold voltage VT, and outputs a binary digital signal D1 that indicates the magnitude relationship between the voltage V1 and the threshold voltage VT.

The voltage V1 input to the AD converter 120 and the voltage V1 input to the comparator 130 are supplied to the rotation detection device 100 via respective external terminals T11 and T12. By this means, the voltage V1 input to the AD converter 120 and the voltage V1 input to the comparator 130 can be prevented from interfering with each other. As a result of this, it is possible to prevent the accuracy of detection by the AD converter 120 and the comparator 130 from decreasing.

Figure 3:
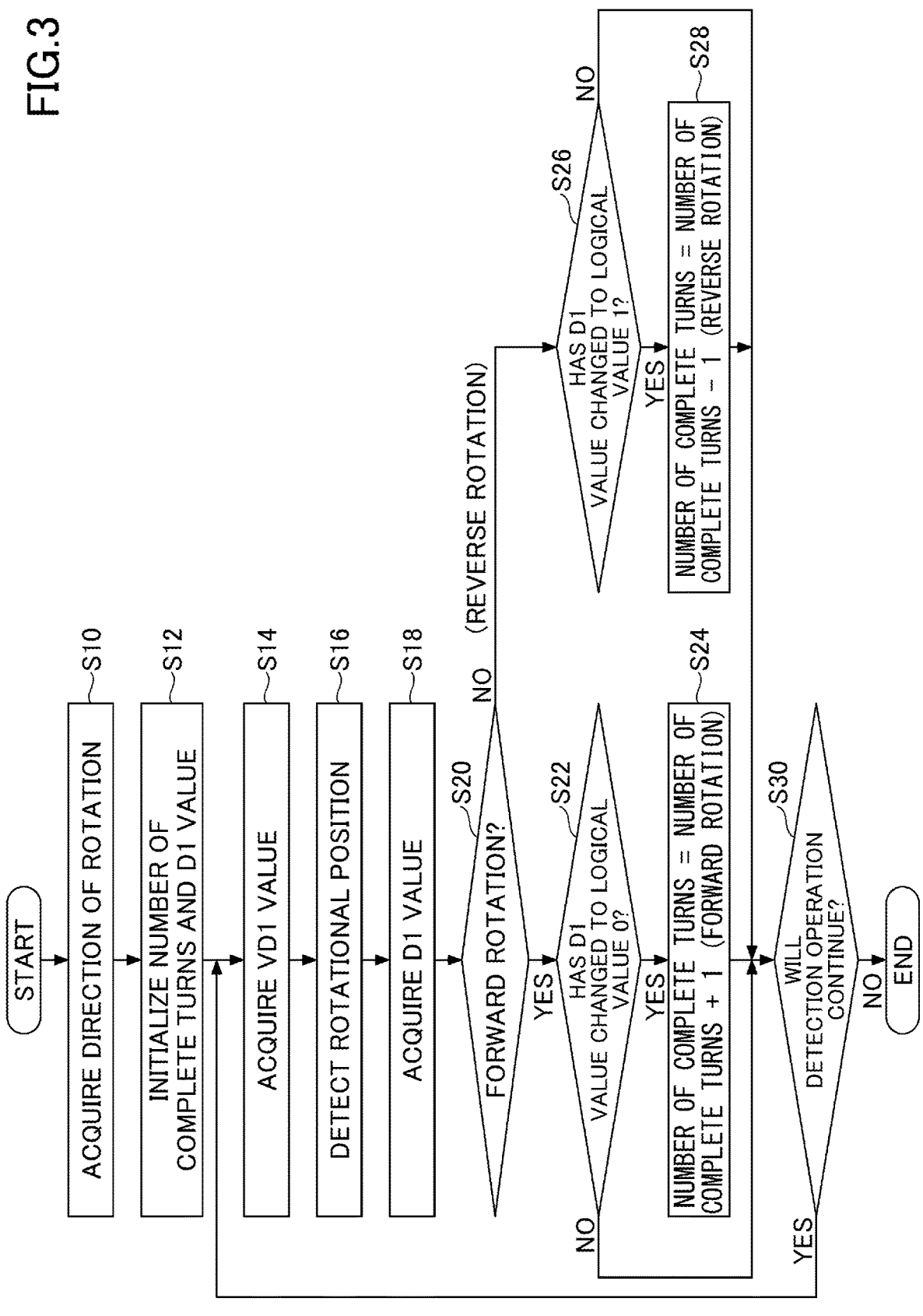
FIG. 3 is a flowchart that illustrates an example of the operation of the rotation detection device when the motor of FIG. 1 is being driven.

The controller 140 detects the rotational position (absolute position) of the rotating shaft 230 based on the digital voltage value VD1 from the AD converter 120. The controller 140 detects the number of complete turns the rotating shaft 230 has made, based on the digital signal D1 from the comparator 130 and information that indicates the direction of rotation of the rotating shaft 230, which is received from the driver that controls the rotation of the motor 210. An example of the operation of the controller 140 is shown in FIG. 3.

FIG. 2 is a timing diagram that illustrates an example of the operation of the rotation detection device 100 of FIG. 1. For example, the waveforms shown in FIG. 2 show a case in which the rotating shaft 230 of FIG. 1 rotates forward. When the rotating shaft 230 rotates in the reverse direction, the waveforms become ones in which the left and right are reversed on the time axis. In the following description, the operation when the rotating shaft 230 rotates forward will be mainly described.

When the rotating shaft 230 is in a predetermined range of rotation angles (initial position), the potentiometer 240 outputs a voltage V1 of 0 V. When the rotating shaft 230 rotates and moves away from its initial position, the potentiometer 240 outputs voltages V1 (the maximum value being Vmax) in accordance with changes of the rotation angle until the rotation angle peaks. The potentiometer 240 outputs a voltage V1 of 0 V when the rotation angle of the rotating shaft 230 returns from the maximum position to the initial position.

In this way, when the rotating shaft 230 rotates, the potentiometer 240 gradually increases the voltage V1 from 0 V to Vmax, then sets it to 0 V, and maintains the voltage V1 at 0 V while the rotating shaft 230 is in the initial position. By this means, the potentiometer 240 outputs voltages V1 that form a triangular wave. The comparator 130 outputs a low-level digital signal D1 (logical value 0) when the voltage V1 output from the potentiometer 240 is lower than the threshold voltage VT. The comparator 130 outputs a high-level digital signal D1 (logical value 1) when the voltage V1 is greater than or equal to the threshold voltage VT.

That is, the comparator 130 generates a transition edge of the digital signal D1 every time the voltage V1 crosses the threshold voltage VT. To be more specific, the comparator 130 changes the digital signal D1 from the low level to the high level when the voltage V1 becomes higher than the threshold voltage VT. The comparator 130 changes the digital signal D1 from the high level to the low level when the voltage V1 becomes lower than the threshold voltage VT. In this example, a "transition edge" of the digital signal D1 refers to a rising edge, which is a transition from the low level to the high level, or a falling edge, which is a transition from the high level to the low level.

The AD converter 120 converts the voltages V1 output from the potentiometer 240 into digital voltage values VD1. Note that the step-like waveform of digital voltage values VD1 shown in FIG. 2 has a small number of steps for ease of understanding; however, the number of steps in the actual waveform is determined depending on the resolution of the AD converter 120.

When the driver is driving the motor 210 in the forward direction of rotation, the controller 140 of FIG. 1 detects one rotation (complete turn) of the rotating shaft 230 in sync with a falling edge of the digital signal D1 that is output from the comparator 130. When the driver is driving the motor 210 in the reverse direction of rotation, the controller 140 detects one rotation (complete turn) of the rotating shaft 230 in sync with a rising edge of the digital signal D1 that is output from the comparator 130. An example of complete-turn detection control by the controller 140 will be described below with reference to FIG. 3.

FIG. 3 is a flowchart that shows an example of the operation of the rotation detection device 100 of FIG. 1 when the motor 210 is being driven. For example, FIG. 3 is realized when the controller 140 of the rotation detection device 100 executes a rotation detection program. FIG. 3 shows an example of the rotation detection method. The flow shown in FIG. 3 is started when the rotating shaft 230 is in a predetermined initial position and an indication to start rotation arrives from the driver that controls the rotation of the motor 210.

First, in step S10, the controller 140 acquires, from the driver, information that indicates the direction of rotation of the rotating shaft 230. The controller 140 may keep this acquired information indicating the direction of rotation, in a holder such as a register. Next, in step S12, the controller 140 initializes the holder that keeps the number of complete turns such as a register to a positive value (such as 3 or 5), and initializes the holder that keeps the logical values of the digital signal D1 such as a register to 0. By initializing the number of complete turns to a positive value, the number of complete turns can be treated as a positive value even when the rotating shaft 230 rotates in the reverse direction and the number of complete turns decreases.

Note that the controller 140 may initialize the holder that keeps the number of complete turns such as a register to 0. In this case, when the number of complete turns is a positive value, the controller 140 can identify that this is the number of complete turns in forward rotation; likewise, when the number of complete turns is a negative value, the controller 140 can identify that this is the number of complete turns in reverse rotation.

Next, in step S14, the controller 140 obtains a digital voltage value VD1 output from the AD converter 120. Next, in step S16, the controller 140 detects the rotational position of the rotating shaft 230 based on the acquired digital voltage value VD1, and reports information that indicates the detected rotational position of the rotating shaft 230 to the driver and the like.

Next, in step S18, the controller 140 obtains the logical value of a digital signal D1 that is output from the comparator 130. Note that the controller 140 keeps the logical value of the digital signal D1 acquired last time, in a holder such as a register. In the first loop of the process, the logical value 0, initialized in step S12, is used as the logical value of the digital signal D1 acquired last time. In the following description, the logical value of the digital signal D1 will be also referred to as the "logical value D1."

Next, in step S20, the controller 140 determines the direction of rotation of the rotating shaft 230, that is, whether the rotating shaft 230 is rotating forward or rotating in the reverse rotation, based on the information acquired in step S10. If the rotation of the rotating shaft 230 is forward rotation, the process moves to step S22. If the rotation of the rotating shaft 230 is reverse rotation, the process moves to step S26.

In step S22, the controller 140 determines whether the digital signal D1 has changed from the logical value 1 to the logical value 0 based on the logical value D1 acquired in step S18 and the logical value D1 acquired last time. If the digital signal D1 has changed from the logical value 1 to the logical value 0, a complete turn of the rotating shaft 230 is detected, so that the process moves to step S24. If the digital signal D1 has not changed from the logical value 1 to the logical value 0, no complete turn of the rotating shaft 230 is detected, so that the process moves to step S30.

In step S24, the controller 140, having detected that the rotating shaft 230 has completed one rotation in the forward direction, increases the number of complete turns by 1, and the process moves to step S30. For example, the controller 140 reports the updated number of complete turns to the driver and the like.

In step S26, the controller 140 determines whether the digital signal D1 has changed from the logical value 0 to the logical value 1, based on the logical value D1 acquired in step S18 and the logical value D1 acquired last time. If the digital signal D1 has changed from the logical value 0 to the logical value 1, a complete turn of the rotating shaft 230 is detected, and the process moves to step S28. If the digital signal D1 has not changed from the logical value 0 to the logical value 1, no complete turn of the rotating shaft 230 is detected, and the process moves to step S30.

In step S28, the controller 140, having detected that the rotating shaft 230 has completed one rotation in the reverse direction, subtracts 1 from the number of complete turns, and the process moves to step S30. For example, the controller 140 reports the updated number of complete turns to the driver and the like. Note that, if the direction of rotation acquired in step S10 is kept in a holder, the controller 140 may increase the number of complete turns by 1 based on the fact that the rotating shaft 230 has completed one rotation in the reverse direction. Thus, even when the number of rotations is increased by 1 in this manner regardless of the direction of rotation, the controller 140 can still recognize the direction of rotation and the number of complete turns.

In step S30, if the controller 140 continues the operation of detecting the rotation of the rotating shaft 230, the process moves to step S14. If the controller 140 stops the operation of detecting the rotation of the rotating shaft 230, the process shown in FIG. 3 ends.

As described above, the operation shown in FIG. 3 allows the controller 140 to detect the number of complete turns of the rotating shaft 230. In so doing, the controller 140 keeps the logical value of the digital signal D1 acquired last time, and compares it with the logical value of the digital signal D1 acquired at present, so that the controller 140 can detect when the rotating shaft 230 completes one rotation, and count the number of complete turns of the rotating shaft 230.

Therefore, the detection process can be made simple compared to the process of detecting whether the rotating shaft 230 has completed one rotation based on the trend of change over multiple past digital voltage values VD1. As a result of this, the size of the rotation detection program for detecting the number of complete turns of the rotating shaft 230 can be reduced. Also, since the digital voltage value VD1 is not used to detect the number of complete turns of the rotating shaft 230, even if the resolution of the AD converter 120 is increased, it is still possible to prevent the process of detecting the number of complete turns from becoming complex.

Note that the controller 140 may have holders such as registers that keep the number of complete turns in forward rotation and the number of complete turns in reverse rotation separately. In this case, for example, even if the rotating shaft 230 rotates forward and then rotates in the reverse direction, the number of complete turns in forward rotation and the number of complete turns in reverse rotation can be kept in a distinguishable manner.

Figure 4:
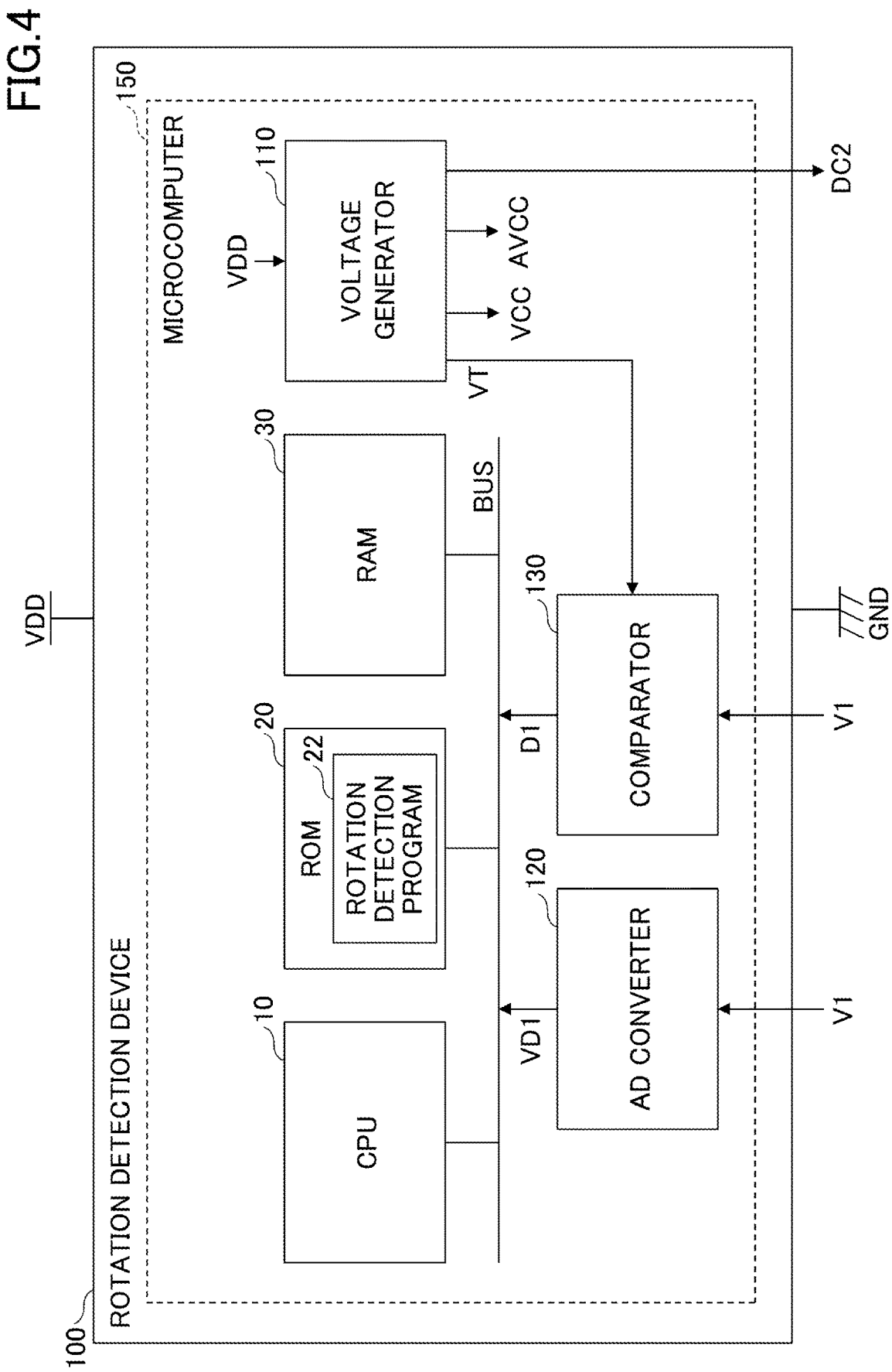
FIG. 4 is a block diagram that illustrates an example hardware structure of the rotation detection device of FIG. 1.

FIG. 4 is a block diagram that illustrates an example hardware structure of the rotation detection device 100 of FIG. 1. Elements that are the same as in FIG. 1 are assigned the same reference codes. For example, the rotation detection device 100 includes a microcomputer 150. Although this is not a limitation, the microcomputer 150 is, for example, what is referred to as a "one-chip microcomputer" (semiconductor chip).

The microcomputer 150 includes a CPU 10, a read-only memory (ROM) 20, a random access memory (RAM) 30, an AD converter 120, a comparator 130, and a voltage generator 110, which are interconnected by a bus BUS. The ROM 20 stores a rotation detection program. Note that the voltage generator 110 may be located outside the microcomputer 150.

The CPU 10 controls the overall operation of the rotation detection device 100, and also implements the functions of the controller 140 of FIG. 1 by executing the rotation detection program. The CPU 10 is an example of a computer. For example, the CPU 10 acquires the digital voltage values of VD1 that are output from the AD converter 120, and the logical values of the digital signal D1 that are output from the comparator 130, via the bus BUS. Then, as shown in FIG. 3, the CPU 10 performs the operation of detecting the rotational position and the number of complete turns of the rotating shaft 230.

As described above, according to this embodiment, the controller 140 keeps the logical value of the digital signal D1 acquired last time, and compares it with the logical value of the digital signal D1 acquired at present, so that the controller 140 can detect when the rotating shaft 230 has completed one rotation, and detect the number of complete turns of the rotating shaft 230. Therefore, the detection process can be made simple compared to the process of detecting whether the rotating shaft 230 has completed one rotation based on the trend of change over multiple past digital voltage values VD1. As a result of this, the size of the rotation detection program for detecting the number of complete turns of the rotating shaft 230 can be reduced.

The controller 140 can detect the rotational position of the rotating shaft 230 based on the digital voltage values of VD1 that are output from the AD converter 120 in accordance with the voltage V1 from the potentiometer 240.

The voltage V1 is supplied to the rotation detection device 100 through separate external terminals T11 and T12, so that it is possible to prevent the voltage V1 that is input to the AD converter 120 and the voltage V1 that is input to the comparator 130 from interfering with each other. As a result of this, it is possible to prevent the accuracy of detection by the AD converter 120 and the comparator 130 from decreasing.

Although the present invention has been described in detail above, the present invention is by no means limited to such a specific embodiment, and various modifications and improvements can be made without departing from the spirit of the present invention.

This application is based on and claims priority to Japanese Patent Application No. 2021-089154, filed with the Japan Patent Office on May 27, 2021, the entire contents of which are incorporated herein by reference.

REFERENCE SIGNS LIST

100 rotation detection device
110 voltage generator
120 analog-to-digital converter (ADC)
130 comparator (CMP)
140 controller
150 microcomputer
200 actuator
210 motor
220 gear
230 rotating shaft
240 potentiometer
1000 system
AVCC power supply voltage
D1 digital signal
DC2 DC voltage
T11, T12 external terminal
V1 voltage
VCC power supply voltage
VD1 digital voltage value
VT threshold voltage

The invention claimed is:

1. A rotation detection device comprising:

a comparator configured to generate a digital signal that indicates a magnitude relationship between a voltage, which is output from a potentiometer in accordance with an amount of rotation of a rotating body, and a threshold voltage;

an analog-to-digital converter configured to convert the voltage output from the potentiometer into a digital value;

a controller configured to detect a number of complete turns of the rotating body based on transition edges of the digital signal, and, in conjunction therewith, detects the amount of rotation of the rotating body based on the digital value output from the analog-to-digital converter; and a semiconductor chip including a first terminal and a second terminal that are configured to receive the voltage output from the potentiometer, the analog-to-digital converter, the comparator, and the controller, wherein the analog-to-digital converter receives, from the first terminal, the voltage output from the potentiometer, and wherein the comparator receives, from the second terminal, the voltage output from the potentiometer.

\* \* \* \* \*